United States Patent
Itoyama et al.

(10) Patent No.: US 6,341,584 B1
(45) Date of Patent: Jan. 29, 2002

(54) VALVE TIMING CONTROL DEVICE AND METHOD FOR VEHICLE ENGINE

(75) Inventors: Hiroyuki Itoyama, Yokohama; Yasuhiko Kitajima, Kamakura; Yoshitaka Deguchi, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/436,633

(22) Filed: Nov. 9, 1999

(30) Foreign Application Priority Data

Nov. 9, 1998 (JP) .......................................... 10-317344

(51) Int. Cl.⁷ ............................................ F02D 13/02
(52) U.S. Cl. ............................ 123/90.15; 123/179.16; 180/65.2; 180/65.4
(58) Field of Search ................... 123/90.15, 90.16, 123/90.17, 90.18, 179.16; 180/65.1, 65.2, 65.3, 65.4

(56) References Cited

U.S. PATENT DOCUMENTS

| | | | | |
|---|---|---|---|---|
| 5,738,056 A | * | 4/1998 | Mikame et al. | 123/90.17 |
| 5,826,671 A | * | 10/1998 | Nakae et al. | 180/65.2 |
| 5,924,395 A | * | 7/1999 | Moriya | 123/90.17 |
| 5,924,397 A | * | 7/1999 | Moriya et al. | 123/90.18 |
| 5,934,395 A | * | 8/1999 | Koide et al. | 180/65.2 |
| 5,957,095 A | * | 9/1999 | Kako | 123/90.15 |
| 6,006,708 A | * | 12/1999 | Ken et al. | 123/90.17 |
| 6,135,077 A | * | 10/2000 | Moriya et al. | 123/90.17 |

FOREIGN PATENT DOCUMENTS

JP 9-242520 9/1997

OTHER PUBLICATIONS

Nissan Blue Bird; (Supplement II, Nissan Motor Co., Ltd.); Oct. 1998; pp. 39–52.

* cited by examiner

Primary Examiner—Wellun Lo
(74) Attorney, Agent, or Firm—Foley & Lardner

(57) ABSTRACT

This invention relates to a valve timing control device for a vehicle engine (2) which performs combustion stop in a predetermined vehicle running condition. The predetermined vehicle running condition comprises, for example, engine startup, and combustion stop is performed by stopping fuel supply to the engine (2) or stopping ignition of the supplied fuel. The device comprises an actuator (51A, 52, 55, 61) which varies the timing of an intake valve of the engine (2) according to an input signal, and a microprocessor (16, 31) which outputs the signal to the actuator (51A, 52, 55, 61). The microprocessor (16, 31) is programmed to determine whether or not combustion has stopped (S80), and when combustion has stopped, control the signal so that the open/close timing of the intake valve is retarded compared to the case when combustion has not stopped (S94).

16 Claims, 17 Drawing Sheets

FIG.21

| APS | BRAKE | VSP | TMPbat | SOC | ENGINE | MOTOR 1 | CLUTCH | MOTOR 4 |
|---|---|---|---|---|---|---|---|---|
| RELEASED | DEPRESSED | 0 | SUITABLE | SUFFICIENT/EXCESSIVE | NO | NO | DISENGAGED | O |
| | | | NOT SUITABLE | INSUFFICIENT | | | | (CREEP) |
| RELEASED | RELEASED | LOW | SUITABLE | SUFFICIENT/EXCESSIVE | O | GENERATING | DISENGAGED | O |
| | | | NOT SUITABLE | INSUFFICIENT | | | | |
| RELEASED | RELEASED | MIDDLE | SUITABLE | SUFFICIENT | NO | NOT GENERATING | DISENGAGED | RB |
| | | | | EXCESSIVE | FUEL CUT | | ENGAGED | NO |
| | | | | INSUFFICIENT | O | GENERATING | DISENGAGED | RB |
| | | | NOT SUITABLE | -- | | | ENGAGED | NO |
| RELEASED | RELEASED | HIGH | SUITABLE | SUFFICIENT | FUEL CUT | NOT GENERATING | ENGAGED | RB |
| | | | | EXCESSIVE | | | | NO |
| | | | | INSUFFICIENT | O | GENERATING | | RB |
| | | | NOT SUITABLE | -- | | | | NO |
| SMALL | RELEASED | LOW | SUITABLE | SUFFICIENT/EXCESSIVE | NO | NOT GENERATING | DISENGAGED | O |
| | | | | INSUFFICIENT | O | GENERATING | PARTIALLY ENGAGED | NO |
| | | | NOT SUITABLE | -- | | | | |
| SMALL | RELEASED | MIDDLE | SUITABLE | SUFFICIENT/EXCESSIVE | NO | NOT GENERATING | DISENGAGED | O |
| | | | | INSUFFICIENT | O | GENERATING | ENGAGED | NO |
| | | | NOT SUITABLE | -- | | | | |
| SMALL | RELEASED | HIGH | SUITABLE | SUFFICIENT/EXCESSIVE | O | NOT GENERATING | ENGAGED | NO |
| | | | | INSUFFICIENT | | GENERATING | | |
| | | | NOT SUITABLE | -- | | | | |
| LARGE | RELEASED | LOW | SUITABLE | SUFFICIENT/EXCESSIVE | O | NOT GENERATING | PARTIALLY ENGAGED | O |
| | | | | INSUFFICIENT | | GENERATING | | NO |
| | | | NOT SUITABLE | -- | | | | |
| LARGE | RELEASED | MIDDLE TO HIGH | SUITABLE | SUFFICIENT/EXCESSIVE | O | NOT GENERATING | ENGAGED | O |
| | | | | INSUFFICIENT | | GENERATING | | NO |
| | | | NOT SUITABLE | -- | | | | |

O : OPERATING
NO : NOT OPERATING
RB : REGENERATIVE BRAKING

VALVE TIMING CONTROL DEVICE AND METHOD FOR VEHICLE ENGINE

FIELD OF THE INVENTION

This invention relates to control of a valve open/close timing of an engine intake valve of a hybrid electric vehicle provided with an engine and an electric motor.

BACKGROUND OF THE INVENTION

A hybrid electric vehicle which runs under the power of either an engine or motor, or both, is disclosed in pp. 39–52 of "Automobile Engineering", Vol. 46, No.7, published in June, 1997 in Japan by Tetsudo Nihon Sha.

In a low vehicle speed region where the engine thermal efficiency is low, the vehicle runs mainly under the driving force of the motor, and when the vehicle speed and load are increased, the vehicle runs mainly under the driving force of the engine. Also, during deceleration, the motor functions as a generator due to the kinetic energy of the vehicle, generates power, and charges a battery.

When the vehicle is running in an urban area, it frequently starts and stops, and starting and stopping of the engine also occur frequently. Under such conditions, it is desirable to delay the valve closing timing of the intake valve to reduce friction of the engine. This is because reduction of engine friction leads to an increased regeneration power amount of the motor, improvement in the starting characteristics of the engine, and reduction of engine vibration, etc. For this reason, the hybrid electric vehicle varies the open/close timing of the intake valve of the engine according to the running conditions of the vehicle.

Regarding variation of the open/close timing of such an intake valve, Tokkai Hei 9-242520 published by the Japanese Patent Office in 1997 discloses a variable valve timing device wherein the initial rotation angle of an intake cam is varied.

SUMMARY OF THE INVENTION

In a hybrid electric vehicle, even in the low vehicle speed region where the vehicle moves only under the motor, it is necessary to restart the engine immediately and to increase engine torque quickly when the residual amount of power in the battery declines, or when a driver wants to perform rapid acceleration of the vehicle.

However, if the valve closing timing of the intake valve is retarded due to the aforesaid reason when the vehicle is running in an urban area, a delay occurs in the rise of engine output immediately after engine startup.

As a result, the output immediately after engine startup may be insufficient for the desired drivability of the vehicle.

It is therefore an object of this invention to satisfy the dual requirements of engine friction reduction and rapid rise of output during engine startup.

In order to achieve the above object, this invention provides a valve timing control device for changing over an open/close timing of an intake valve of an engine of a vehicle, wherein the engine comprises a combustion stop device for stopping combustion of the engine in a predetermined vehicle running condition. The control device comprises an actuator which varies the open/close timing of the intake valve according to an input signal, and a microprocessor programmed to determine whether or not engine combustion has stopped, and control the signal so that the open/close timing of the intake valve is retarded when engine combustion has stopped compared to a case when combustion has not stopped.

This invention also provides a valve timing control method for changing over an open/close timing of an intake valve of an engine of a vehicle, wherein the engine comprises a combustion stop device for stopping combustion of the engine in a predetermined vehicle running condition. The control method comprises determining whether or not engine combustion has stopped, and retarding the open/close timing of the intake valve when engine combustion has stopped compared to a case when combustion has not stopped.

The details as well as other features and advantages of this invention are set forth in the remainder of the specification and are shown in the accompanying drawings.

BRIEF DESCRIPTION OF THE DRAWINGS

FIG. 21 is a table summarizing the details of the control of the engine, motors and a clutch performed by the controller.

PREFERRED EMBODIMENTS OF THE INVENTION

Figure 1:
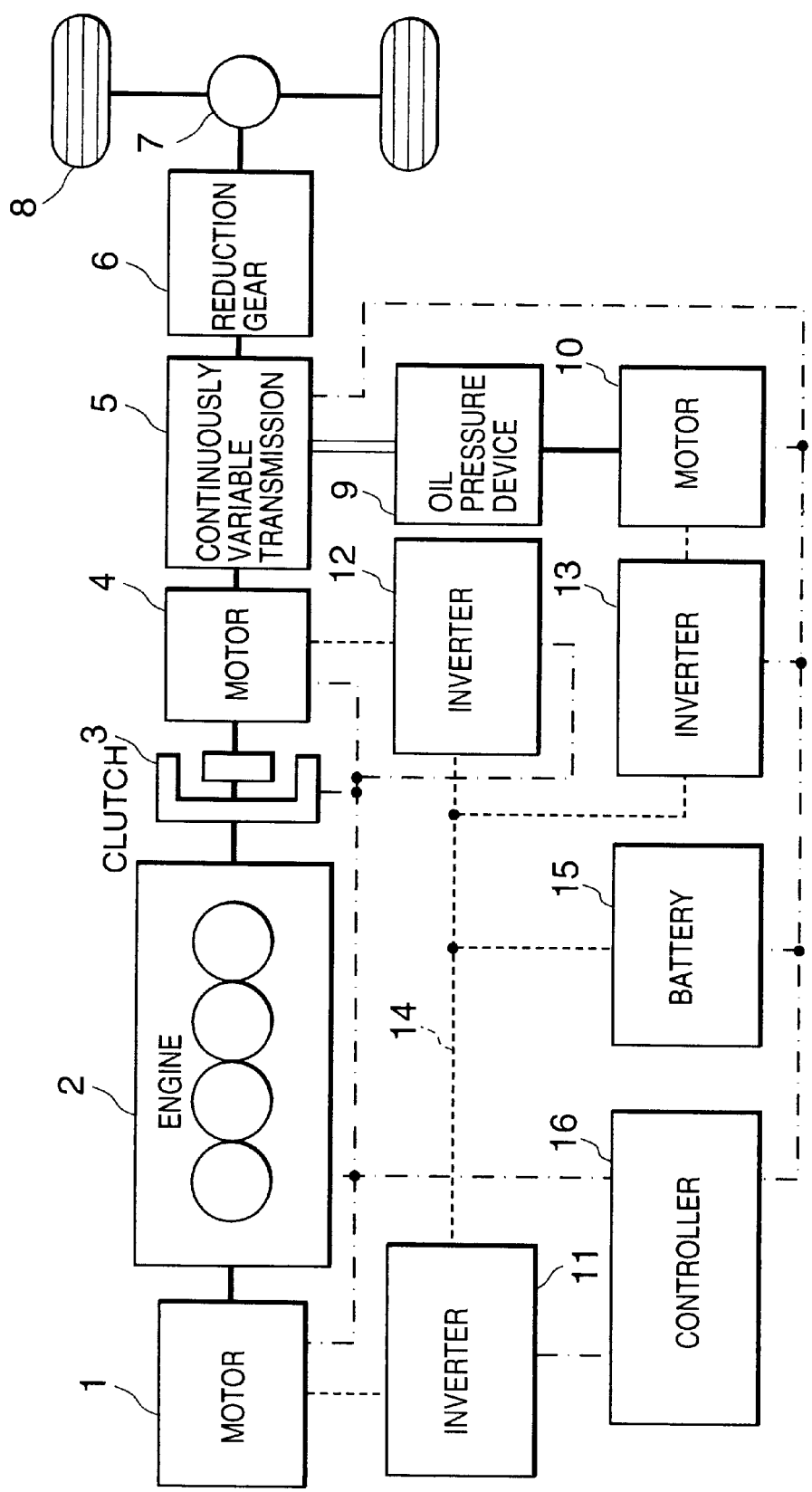
FIG. 1 is a schematic diagram of a drive train of a hybrid electric vehicle to which this invention is applied.

Referring to FIG. 1 of the drawings, a parallel hybrid electric vehicle to which this invention is applied, is provided with an engine 2 connected to a motor 4 via a clutch 3.

The output of the motor 4 is transmitted to drive wheels 8 via a continuously variable transmission 5, reduction gear 6 and differential gear 7. When the clutch 3 is engaged, the drive force of the engine 2 and the motor 4 is transmitted to the drive wheels 8. The clutch 3 comprises a powder clutch wherein the transmitted torque can be adjusted.

The continuously variable transmission 5 is a V-belt continuously variable transmission which transmits the drive force via a V-belt looped over a pair of pulleys under an arbitrary speed ratio. The speed ratio of the continuously variable transmission 5 is varied by an oil pressure supplied from an oil pressure device 9. Another motor 1 is connected to the engine 2.

The motor 1 is mainly used for startup of the engine 2 and power generation. The motor 4 is used for driving the drive wheels 8 and for regenerative power generation which is performed when braking of the vehicle takes place.

Therefore, the motors 1 and 4 are motor/generators. On the other hand, the motor 10 is used to drive an oil pump with which the oil pressure device 9 is provided, and it functions only as a motor. Generation of regenerative power by the motor 4 is normally performed when the clutch 3 is disengaged, but when a regenerative braking force exceeding the ability of the motor 4 is required, the clutch 3 is engaged, and the motor 1 connected to the engine 2 supplements additional braking force by performing regenerative power generation.

The motors 1, 4 and 10 are alternating current motors, and the operation of the motors 1, 4 and 10 is respectively controlled by the inverters 11, 12 and 13.

Direct current motors may also be used as the motors 1, 4 and 10, in which case the inverters are replaced by direct current/direct current converters.

The solid line of FIG. 1 shows the transmission path of mechanical force, the dotted line shows the transmission path of electric power, the dot-and-dash line shows the transmission path of a signal, and the double line shows the transmission path of oil pressure.

The inverters 11, 12 and 13 are connected to a direct current link 14, and a battery 15 is connected to the direct current link 14. The inverters 11, 12 and 13 convert the direct current of the battery 15 into alternating current, and supply it to the motors 1, 4 and 10. The inverters 11 and 12 also convert the alternating current generated by the motors 1 and 4 into direct current, and charge the battery 15.

A controller 16 controls the above drive train and related devices.

The controller 16 comprises a microcomputer equipped with a central processing unit, read-only memory (ROM), random access memory (RAM), and input and output interface (I/O interface).

Figure 2:
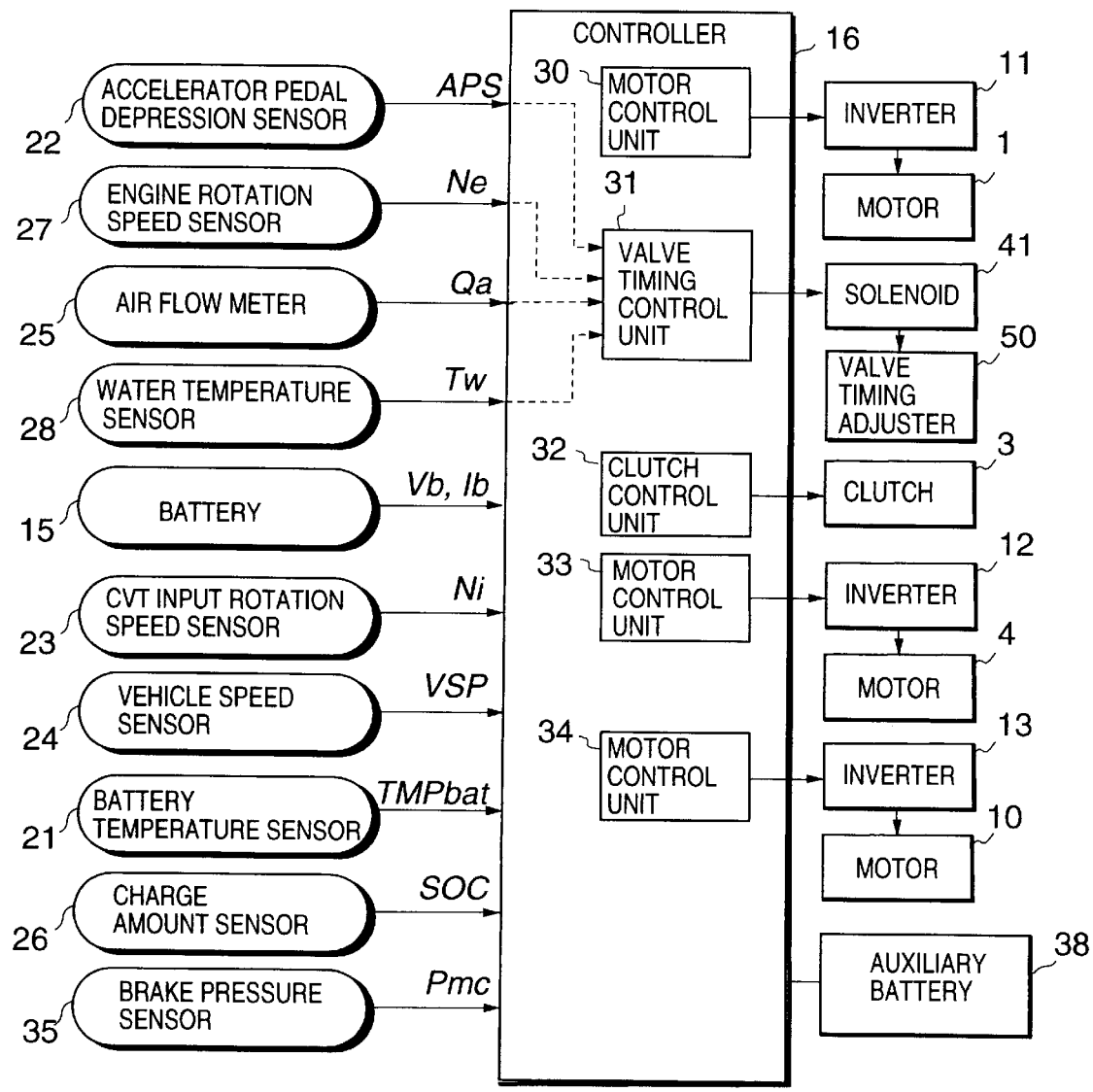
FIG. 2 is a schematic diagram of a controller of a hybrid electric vehicle according to this invention.

Referring to FIG. 2, the controller 16 is provided with a motor control unit 30 which controls the motor 1 via the inverter 11, a clutch control unit 32 which controls the engaging and disengaging of the clutch 3, a motor control unit 33 which controls the motor 4 via the inverter 12, a motor control unit 34 which controls the motor 10 via the inverter 13, and a valve timing control unit 31 which controls the open/close timing of the intake valve of the engine 2 as well as the open/close timing of the exhaust valve thereof. The controller 16 is further provided with an engine control unit which controls a fuel injection amount, fuel injection timing and ignition timing of the engine, and a speed ratio control unit which controls a speed ratio of the continuously variable transmission 5. However, these control units are not directly related to this invention, so they are not shown in the figures. All of the above control units are virtual units for the purpose of describing the function of the controller 16, and do not exist as physical entities.

Signals are input to the controller 16 from an accelerator pedal depression sensor 22 which detects an accelerator depression degree APS of the vehicle, engine rotation speed sensor 27 which detects a rotation speed Ne of the engine 2, air flow meter 25 which detects an intake air flowrate Qa of the engine 2, water temperature sensor 28 which detects a cooling water temperature Tw of the engine 2, CVT input rotation speed sensor 23 which detects an input rotation speed Ni of the continuously variable transmission 5, vehicle speed sensor 24 which detects a vehicle speed VSP, charge amount sensor 26 which detects the state of charge SOC of the battery 15, battery temperature sensor 21 which detects a temperature TMPbat of the battery 15, and a brake pressure sensor 35 which detects a master cylinder pressure Pmc of the vehicle brake. The battery 15 is also connected to the controller 16 by a signal circuit in order to input a voltage Vb and current Ib of the battery 15.

The controller 16 is operated by power supplied from an auxiliary low-pressure battery 38.

Next, the control of the drive train performed by the controller 16 will be described.

The control of the drive train comprises control of the motors 1 and 4, the engine 2, and the clutch 3, as summarized in the table of FIG. 21. Of these, control which is accompanied by the startup of the engine 2 comprises the following three cases.

If the vehicle is started when the state of charge SOC of the battery 15 and the battery temperature TMPbat are suitable, when the accelerator pedal depression amount APS is small, the engine 2 remains in the stop state, the clutch 3 is disengaged, and the vehicle moves forward only under the motor 4. When the vehicle speed VSP reaches a predetermined high vehicle speed while the accelerator pedal depression amount APS is still small, the engine 2 is started, the clutch 3 is engaged, and current supply to the motor 4 is stopped. During startup of the engine 2, to reduce vibration and suppress electric power consumption, the engine 2 is first cranked by the motor 1 without fuel injection for a predetermined time, then fuel injection and ignition are started. This type of startup is referred to as a gradual start. After complete combustion of the engine 2, the clutch 3 is engaged.

Startup of the engine 2 is also performed when the accelerator pedal is largely depressed before the vehicle speed VSP reaches the predetermined high vehicle speed.

In this case, the clutch 3 is put into a partially engaged state when the engine 2 is started up, then the clutch 3 is firmly engaged, and outputs of both the engine 2 and motor 4 are used for acceleration of the vehicle.

Startup of the engine 2 is also performed when the battery state of charge SOC has decreased even if the accelerator pedal depression amount APS is still small, and the vehicle speed VSP does not reach the predetermined high vehicle speed. In this case, the current supplied to the motor 4 is stopped, the clutch 3 is put into a partially engaged state, and the engine 2 is started up. After engine start-up, the clutch 3 is firmly engaged and the output torque of the engine 2 is used for driving the vehicle and for power generation by motor 1.

In both the two latter cases, the drive torque of the engine 2 is required immediately, so cranking of the engine 2 by the motor 1 and fuel injection are performed simultaneously. This type of startup is referred to as immediate startup.

The controller 16 also controls the open/close timing of the intake valve of the engine 2 in relation to control of the drive train including control of the above engine start-up.

Figure 3:
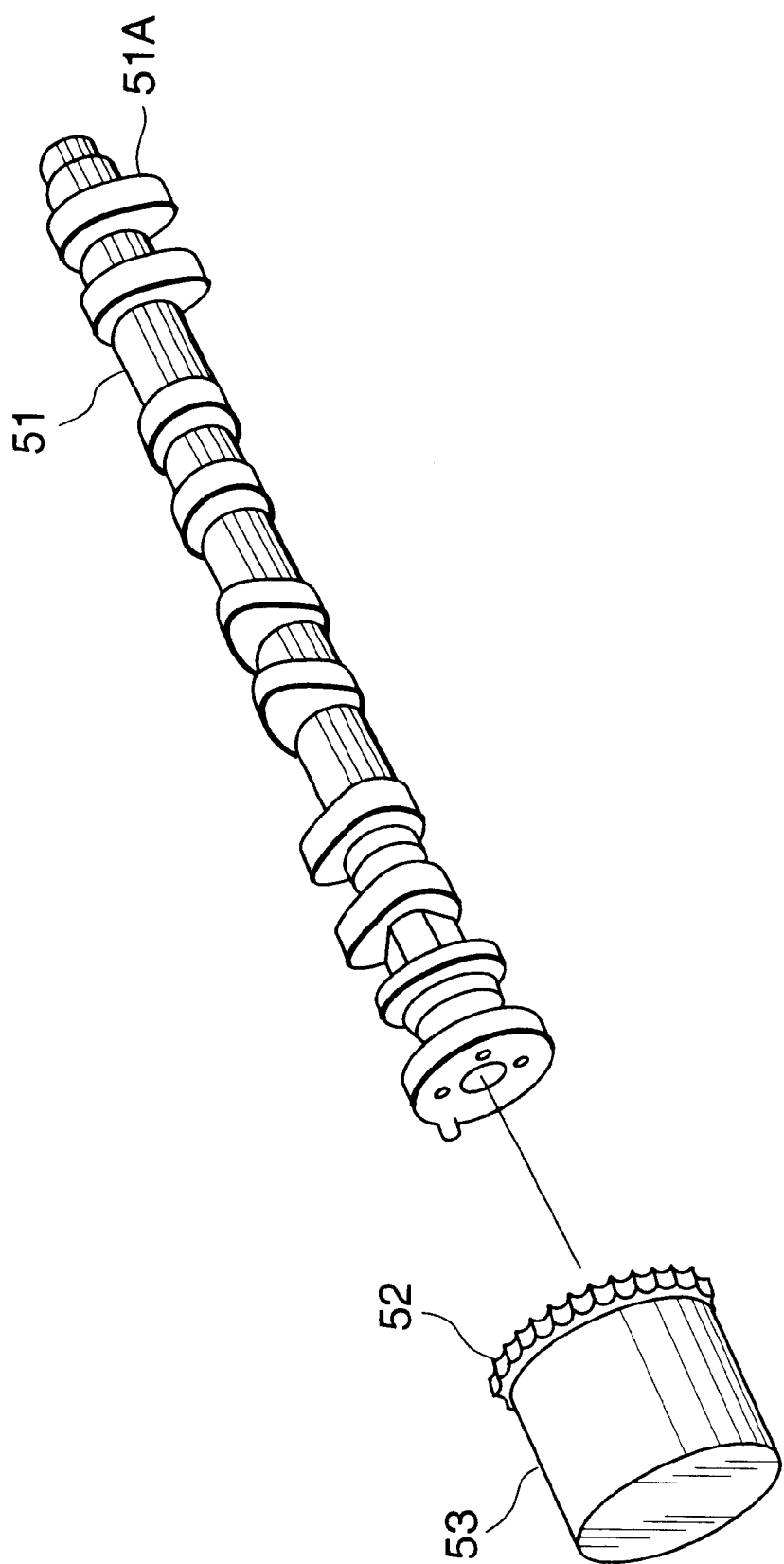
FIG. 3 is a cut-away perspective view of a valve timing change-over mechanism according to this invention.
Figure 4:
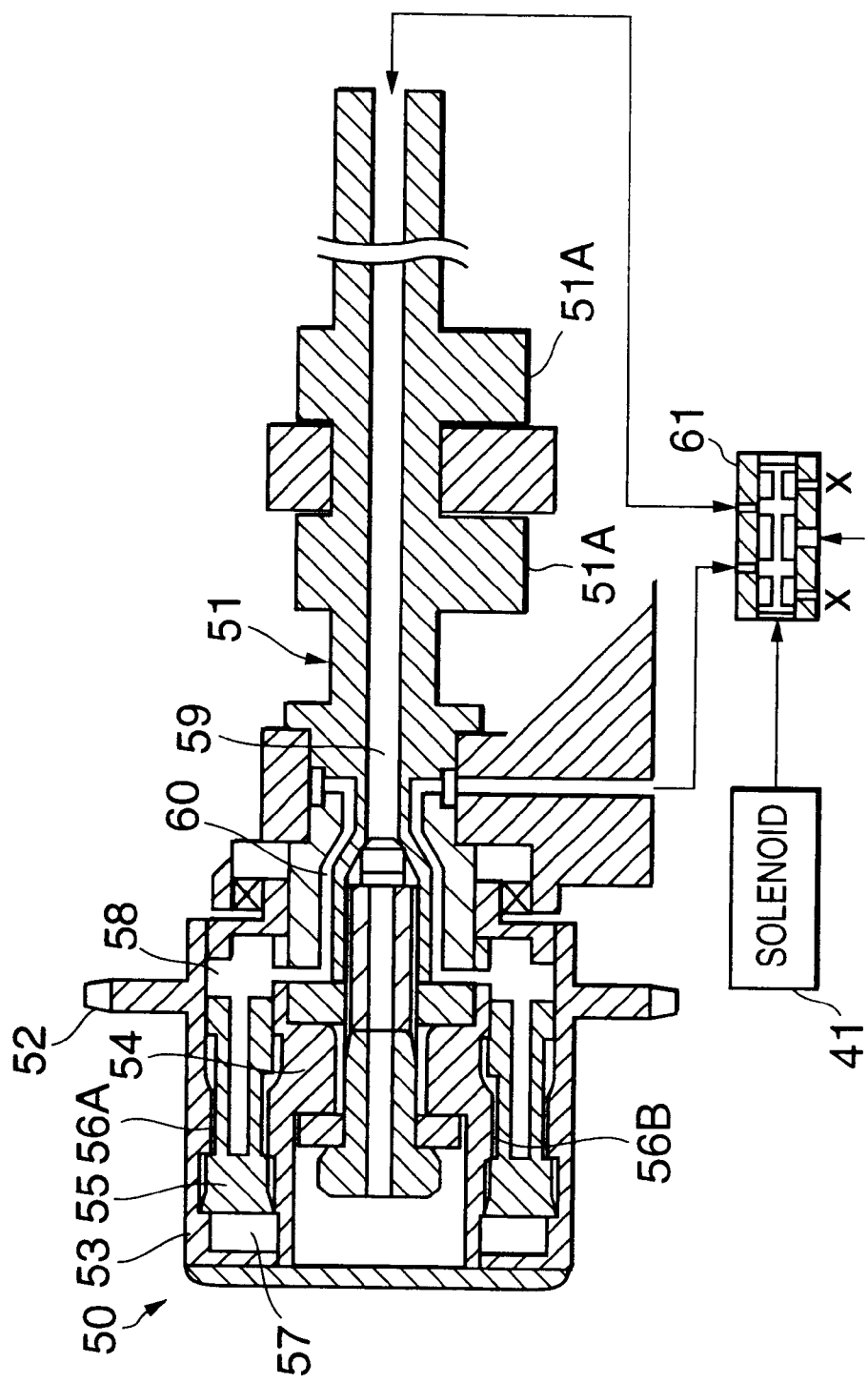
FIG. 4 is a longitudinal sectional view of a valve timing change-over mechanism.

This control is performed via a valve timing change-over mechanism shown in FIGS. 3 and 4. This mechanism is disclosed on page B-91 of the Specifications of Nissan Blue Bird (Supplement II, Nissan Motor Co., Ltd. published in October 1998 in Japan).

The valve timing change-over mechanism comprises an intake cam shaft 51 on which plural intake cams 51A are fixed, a valve timing adjuster 50 provided with a function to transmit the rotation of the engine 2 to the intake cam shaft 51 and change over the initial rotation angle of the intake cam shaft 51, and a control valve 61 which supplies an oil pressure to the valve timing adjuster 50.

The valve timing adjuster 50 is provided with a cam sprocket 52 which is driven by the engine 2 via a chain, not shown. The cam sprocket 52 is formed in one piece with an outer housing 53.

An inner housing 54 is housed in the outer housing 53, and one end of the intake cam shaft 51 is fixed to the inner housing 54.

A piston 55 of annular cross-section which displaces in an axial direction is housed in an annular space between the outer housing 53 and inner housing 54.

The outer circumference of the piston 55 and the inner circumference of the outer housing 53 are engaged via a helical spline 56A. Moreover, the inner circumference of the piston 55 and the outer circumference of the inner housing 54 are also engaged via an identical helical spline 56B. Hence, the outer housing 53 and inner housing 54 rotate relative to each other according to an axial displacement of the piston 55, and the cam sprocket 52 and intake cam shaft 51 rotate relative to each other as a result. Due to the relative rotation of the cam sprocket 52 and intake cam shaft 51, the open/close timing of the intake valve of the engine is advanced or retarded relative to a crank angle of the engine 2.

In order to displace the piston 55 in the axial direction, an advance angle oil chamber 57 is provided between the outer housing 53 in the aforesaid annular space and the piston 55. A retardation angle oil chamber 58 is also provided on the opposite side of the piston 55 to the advance angle oil chamber 57 in the annular space. The advance angle oil chamber 57 is connected to the control valve 61 via a passage 59 formed in the intake cam shaft 51, and the retardation angle oil chamber 58 is connected to the control valve 61 via a passage 60 formed in the intake cam shaft 51.

The control valve 61 connects one of the advance angle oil chamber 57 and retardation angle oil chamber 58 to an oil pump, and the other one of the chambers 57, 58 to a drain, according to the energization of a solenoid 41.

Supply of energizing current to the solenoid 41 is controlled by the above-mentioned valve timing control unit 33 of the controller 16.

Figure 5:
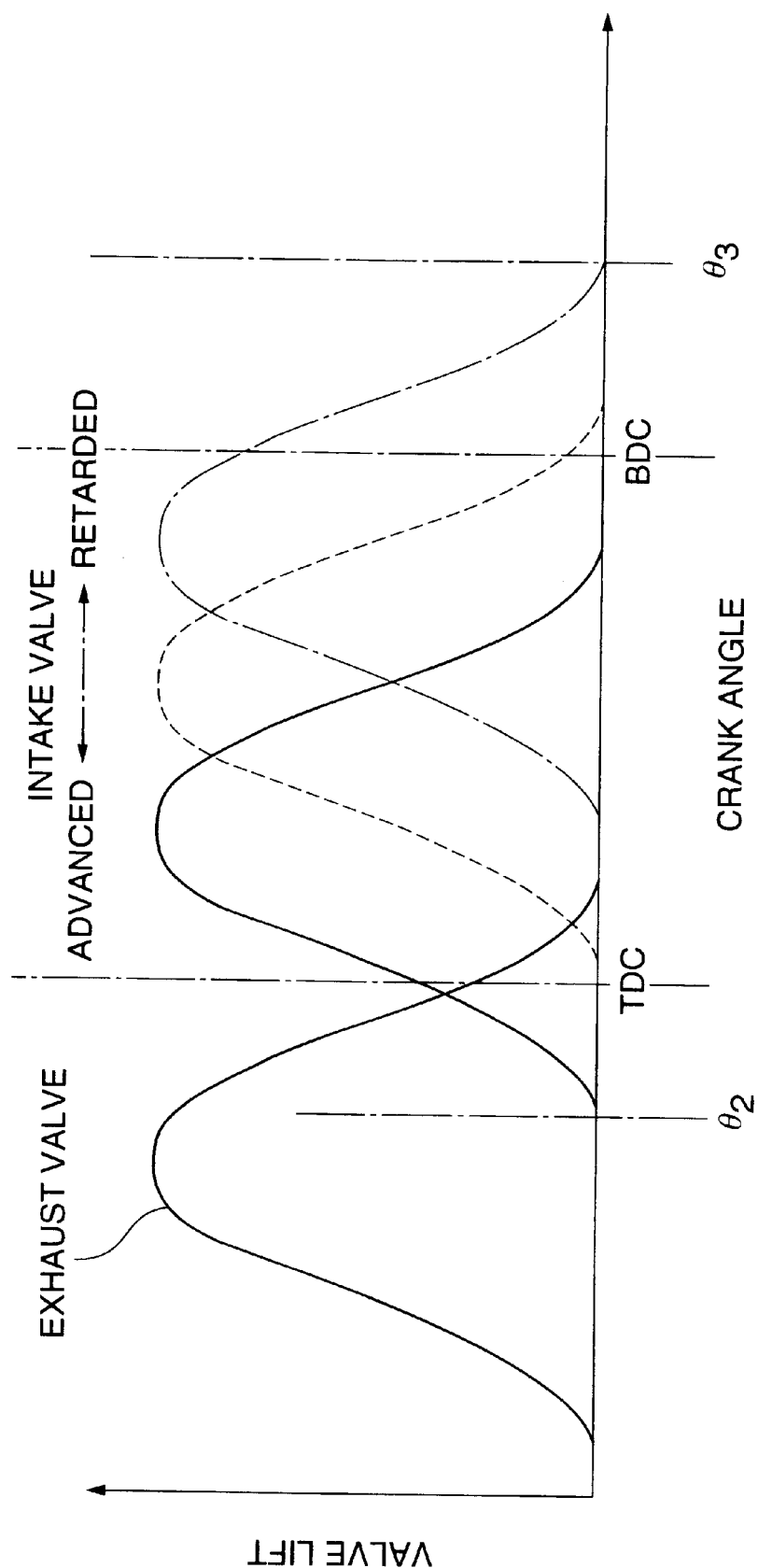
FIG. 5 is a timing chart describing the variation of an open/close timing of an intake valve according to this invention.

When the control valve 61 increases the oil pressure of the advance angle oil chamber 57, and decreases the oil pressure of the retardation angle oil chamber 58, the piston 55 displaces to the right-hand side of the figure, and the open/close timing of the intake valve is advanced to the position of the solid line shown in FIG. 5. Conversely, when the control valve 61 decreases the oil pressure of the advance angle oil chamber 57, and increases the oil pressure of the retardation angle oil chamber 58, the piston 55 displaces to the left-hand side of the figure, and the open/close timing of the intake valve is retarded to the position of the dot-and-dash line shown in FIG. 5.

When the open/close timing of the intake valve is retarded as shown in FIG. 5, the intake valve opens after passing top dead center TDC of the piston, and closes at an angle $\theta_3$ after passing bottom dead center BDC.

Consequently, the intake air volume to the cylinder is decreased, and the pumping loss of the engine 2 becomes small.

On the other hand, if the open/close timing of the intake valve is advanced as shown by the solid line of FIG. 5, the intake valve opens at a crank angle $\theta_2$ before reaching top dead center TDC of the piston, and closes before reaching bottom dead center BDC. As a result, the intake air volume of the engine 2 increases and output torque increases.

When gradual start of the engine 2 is performed, the open/close timing of the intake valve is retarded to reduce engine friction, i.e., pumping loss is decreased. Also, a vibromotive force of the engine is decreased by lowering the compressed air pressure at the top dead center of the piston 3.

When fuel injection is started, the open/close timing is advanced so as to promote rise of engine output torque. The advancing amount of the valve open/close timing is set depending on the engine cooling water temperature Tw.

Next, the start control of the engine 2 performed by the controller 16 will be described in detail referring to the flowcharts.

Figure 6:
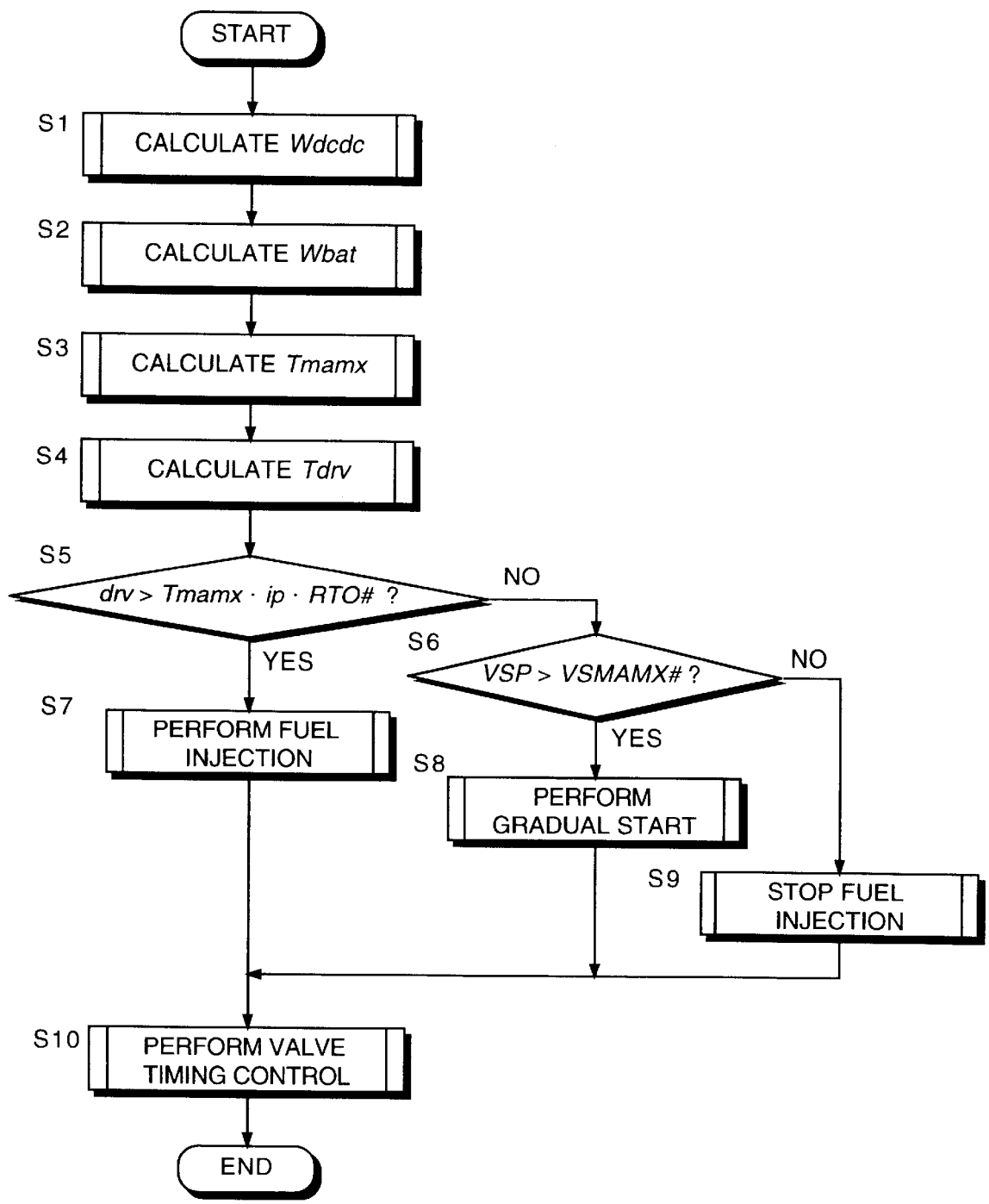
FIG. 6 is a flowchart describing a main routine for timing control of an intake valve performed by a controller according to this invention.

The flowchart shown in FIG. 6 is the main routine of valve timing control, and is performed at an interval of, for example, 10 milliseconds.

FIG. 7, FIG. 8, FIG. 10, FIG. 12, FIG. 16, FIG. 17 and FIG. 19 respectively show subroutines performed in the main routine of FIG. 6.

Figure 7:
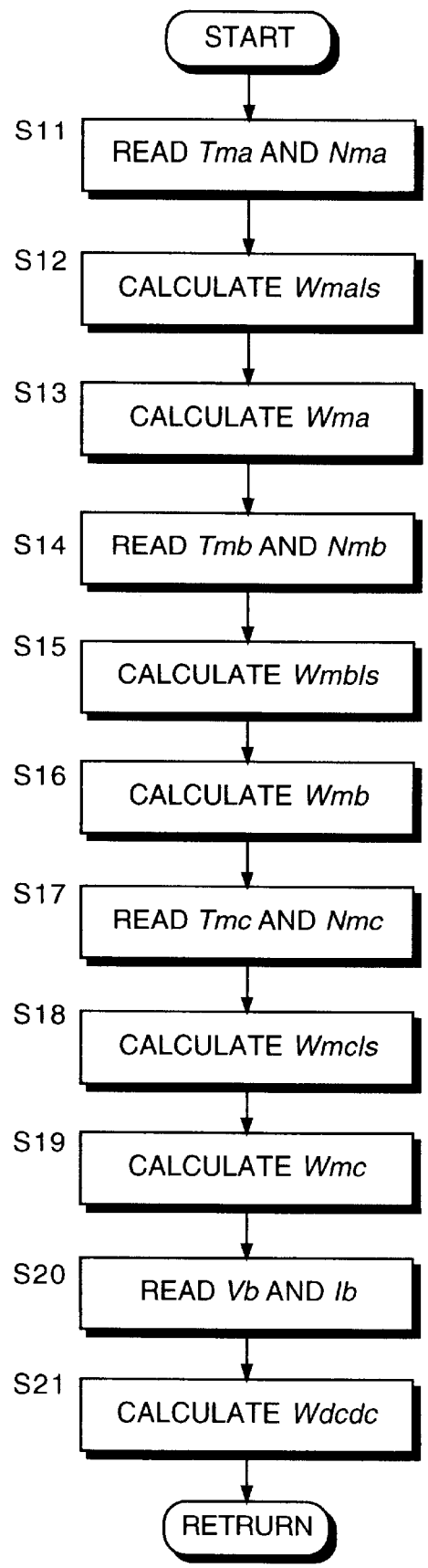
FIG. 7 is a flowchart describing a subroutine for computing power consumption performed by the controller.

Referring to FIG. 6, in a step S1, an electric power Wdcdc for auxiliary equipment which is supplied by the battery 15 is calculated by the subroutine of FIG. 7. The battery 15 supplies current not only to motors 1, 4, 10, but also to various auxiliary equipment of the vehicle, not shown in FIG. 1, such as lamps and an air conditioner.

In a step S1, a sum total value of the power of the battery 15 supplied to this auxiliary equipment is calculated as an auxiliary equipment power consumption Wdcdc.

Figure 8:
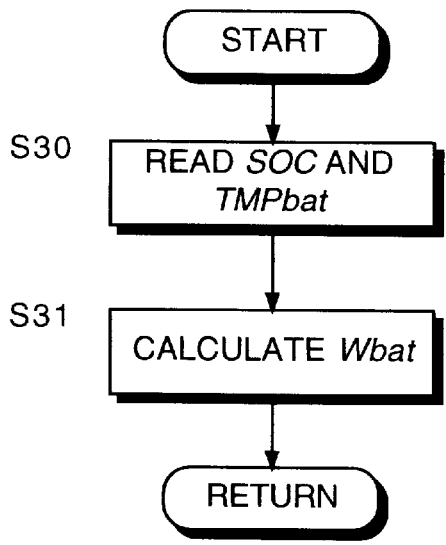
FIG. 8 is a flowchart describing a subroutine for computing a power which can be supplied by a battery, performed by the controller.

In a step S2, a power Wbat which can be supplied by the battery 15 is calculated by the subroutine of FIG. 8 from the state of charge SOC of the battery 15 detected by the battery charge amount sensor 26 and a temperature TMPbat of the battery 15 detected by the battery temperature sensor 21.

Figure 10:
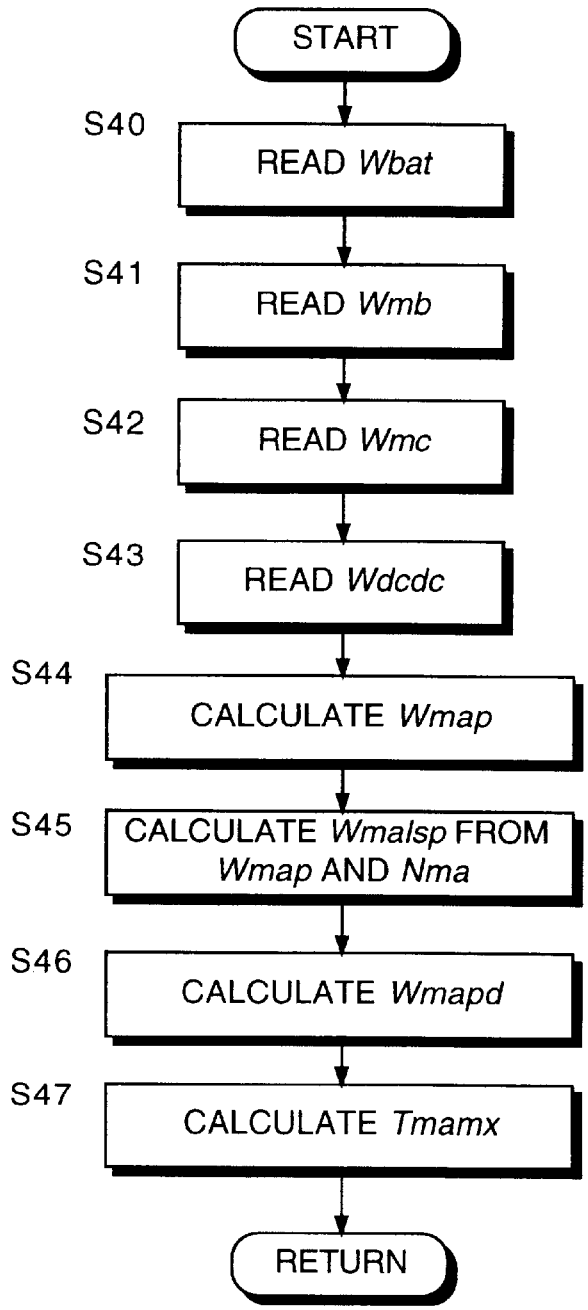
FIG. 10 is a flowchart describing a subroutine for computing a maximum torque of a motor performed by the controller.

In a step S3, a torque Tmamx which can be supplied by the motor 4 is calculated by the subroutine of FIG. 10.

Figure 12:
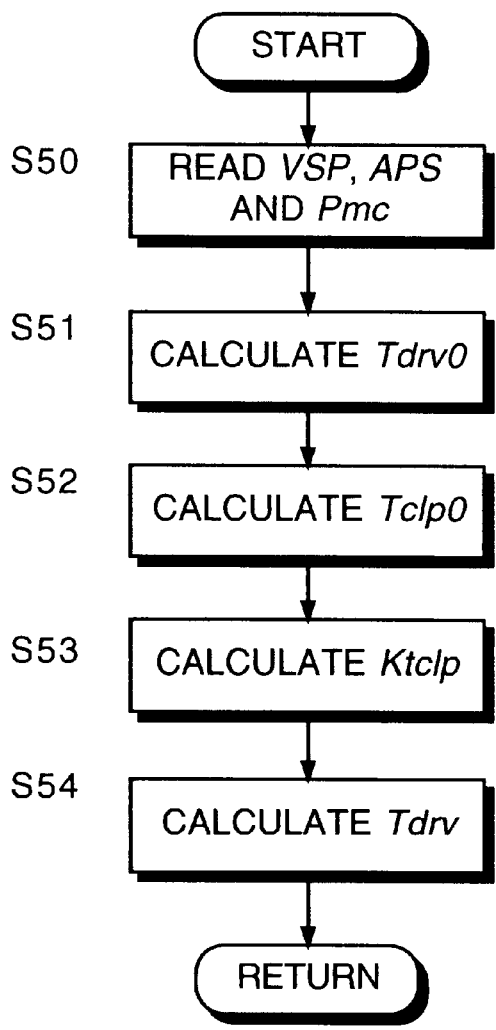
FIG. 12 is a flowchart describing a subroutine for calculating a target drive torque Tdrv performed by the controller.

In a step S4, a target driving torque Tdrv of the drive wheels 8 is calculated by the subroutine of FIG. 12 based on the running state of the vehicle.

In a step S5, it is determined whether or not the target drive torque Tdrv of the drive wheels 8 calculated in the step 54 is larger than the maximum torque Tmamx which can be applied to the drive wheels 8 by the motor 4. For this purpose, the maximum drive torque of the motor 4 is first multiplied by a speed ratio ip of the continuously variable transmission 5 and a ratio RTO# of the differential gear 7 to calculate the maximum torque Tmamx which can be applied by the motor 4 to the drive wheels 8.

When the target drive torque Tdrv is larger than the maximum torque Tmamx·ip·RTO# which the motor 4 can apply to the drive wheels 8, the routine proceeds to a step S7.

Here, fuel is immediately injected in the engine 2 and immediate startup of the engine 2 is performed. When the engine 2 is already running, fuel supply is continued to keep the engine 2 running. This processing of the step S7 is performed by the subroutine of FIG. 16 described later. Even when the target drive torque Tdrv is small, if the state of charge SOC of the battery decreases, the maximum torque Tmamx of the motor 4 which can be supplied, decreases. Therefore, when the state of charge SOC of the battery 15 decreases, the determination result of the step S5 also becomes affirmative, and the routine proceeds to the step S7.

On the other hand, when the target drive torque Tdrv does not exceed the maximum torque Tmamx·ip·RTO# which the motor 4 can apply to the drive wheels 8, the routine proceeds to a step S6.

In the step S6, it is determined whether or not the vehicle speed VSP exceeds a predetermined high vehicle speed VSMAMX#.

When the vehicle speed VSP exceeds the predetermined high vehicle speed VSMAMX#, the routine proceeds to a step S8.

Here, cranking of the engine 2 is performed by the motor 1 while performing fuel cut until the rotation speed Ne of the engine 2 exceeds a predetermined speed Nem and a predetermined time CTMRN# elapses. After these conditions have been established, fuel injection and ignition of the injected fuel are performed. This corresponds to the aforementioned gradual start of the engine 2.

This processing of the step S8 is performed using the subroutine of FIG. 17 described later.

When the vehicle speed VSP does not exceed the predetermined high vehicle speed VSMAMX#, the routine proceeds to a step S9, and either the engine 2 is stopped or the stationary state is maintained by preventing fuel injection in the engine 2. When the vehicle speed falls to the predetermined high vehicle speed VSMAMX# or lower while the vehicle is running only under the drive force of the engine 2, power is supplied to the motor 4 to run the vehicle and the engine is stopped. This case is processed in the step S9, but control of the motor 4 is omitted in the flowchart of FIG. 6.

After performing the processing of the steps S7, S8 and S9, the routine proceeds to a step S10. Here, control of the open/close timing of the intake valve is performed by the subroutine shown in FIG. 19, and the routine is terminated.

Next, the subroutines performed in the steps S1–S4 and steps S7–S10 will now be described.

These subroutines are also performed at the same interval as the main routine.

FIG. 7 shows the subroutine which calculates the electric power Wdcdc for auxiliary equipment performed in the step S1.

In this subroutine, a drive torque Tma and rotation speed Nma of the motor 4 are first read in a step S1. These are detected from the input signal from the inverter 12.

In a step S12, a power loss Wmals of the motor 4 is computed by looking up a map prestored in the controller 16 based on the drive torque Tma and rotation speed Nma.

In a step S13, a power consumption Wmals of the motor 4 is calculated by the next equation (1) from the power loss Wmals, drive torque Tma and rotation speed Nma of the motor 4.

$$Wma = Wmals + Tma \cdot Nma \cdot 1.047488 \cdot 10^{-4} \quad (1)$$

where, $1.047488 \cdot 10^{-4}$ is a predetermined conversion constant.

In steps S14–S16, a power consumption Wmb of the motor 1 is calculated by the same process as that of the steps S11–S13.

In steps S17–S19, a power consumption Wmc of the motor 10 is computed by the same process as that of the steps S11–S13.

In a step S20, the voltage Vb and current Ib of the battery 15 are read from signals input from the battery 15, and an auxiliary equipment power consumption Wdcdc is calculated by the following equation (2).

$$Wdcdc = Vb \cdot Ib - Wma - Wmb - Wmc \quad (2)$$

FIG. 8 shows a subroutine for calculating a power Wbat which can be supplied by the battery 15 performed in the step S2.

In this subroutine, in a step S30, the state of charge SOC of the battery 15 and temperature TMPbat of the battery 15 are read.

Figure 9:
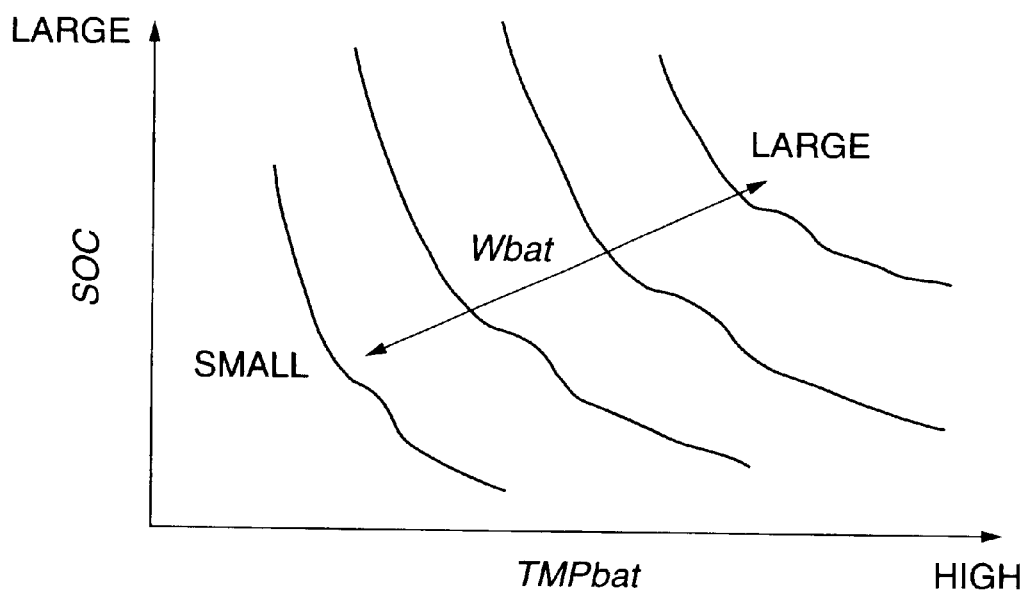
FIG. 9 is a map showing the relation of a battery temperature TMPbat, battery state of charge SOC and battery charge capacity Wbat stored by the controller.

In a step S31, the power Wbat which can be supplied by the battery is calculated from the state of charge SOC and battery temperature TMPbat by looking up a map shown in FIG. 9 which was prestored in the controller 16.

FIG. 10 shows the subroutine performed in the step S3 which calculates the maximum torque Tmamx which can be supplied by the motor 4.

In this subroutine, the power Wbat which can be supplied by the battery 15 calculated in the step S2, is read in a step S40.

In subsequent steps S41–S43, the power consumption Wmb of the motor 1, the power consumption Wmc of the motor 10, and the auxiliary equipment power consumption Wdcdc calculated in the subroutine of FIG. 7, are respectively read.

In a step S44, a power consumption Wmap of the motor 4 is calculated by the following equation (3).

$$Wmap = Wbat - Wmb - Wmc - Wdcdc \quad (3)$$

Figure 11:
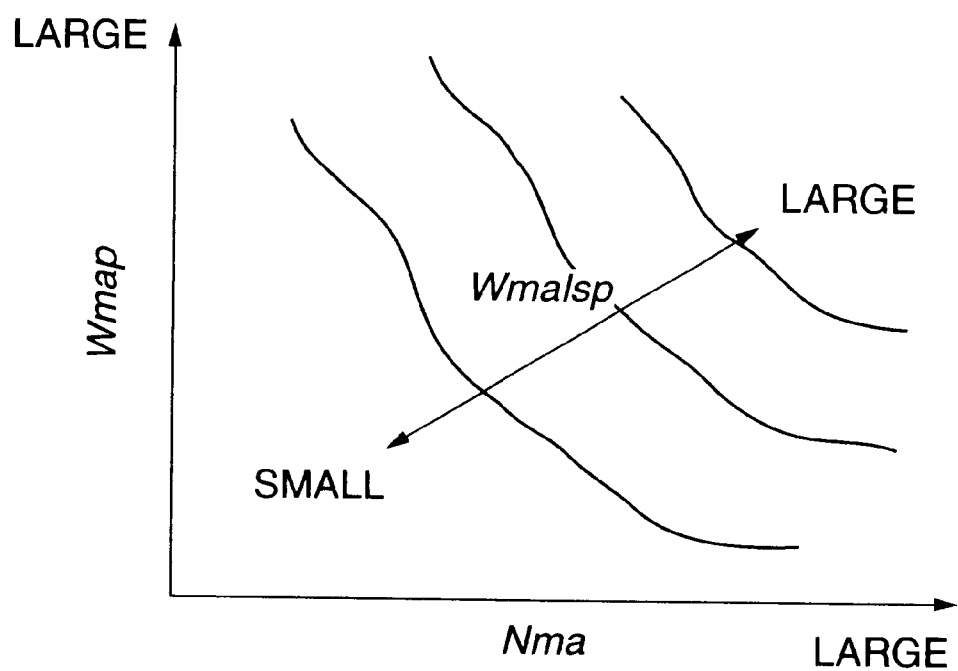
FIG. 11 is a map showing the relation of a motor rotation speed Nma, power consumption Wmap of the motor and energy loss Wmalsp of the motor stored by the controller.

In a step S45, an energy loss Wmalsp of the motor 4 is computed by looking up a map shown in FIG. 11 which was prestored in the controller 16 from the power consumption Wmap of the motor 4 and the rotation speed Nma of the motor 4 read in the step S11 of FIG. 7. In a step S46, an effective power consumption Wmapd of the motor 4 is calculated from the following equation (4).

$$Wmapd = Wmap - Wmalsp \quad (4)$$

In a step S47, the maximum torque Tmamx which can be generated by the motor 4 is calculated by the following equation (5).

$$Tmamx = (Wmapd/Nma)/1.047488 \cdot 10^{-4} \quad (5)$$

where, $1.047488 \cdot 10^{-4}$ is a predetermined conversion constant.

FIG. 12 shows the subroutine for calculating the target drive torque Tdrv of the drive wheels 8 performed in the step S4.

In this subroutine, the vehicle speed VSP, accelerator pedal depression degree APS and master cylinder pressure Pmc is first read in a step S50.

Figure 13:
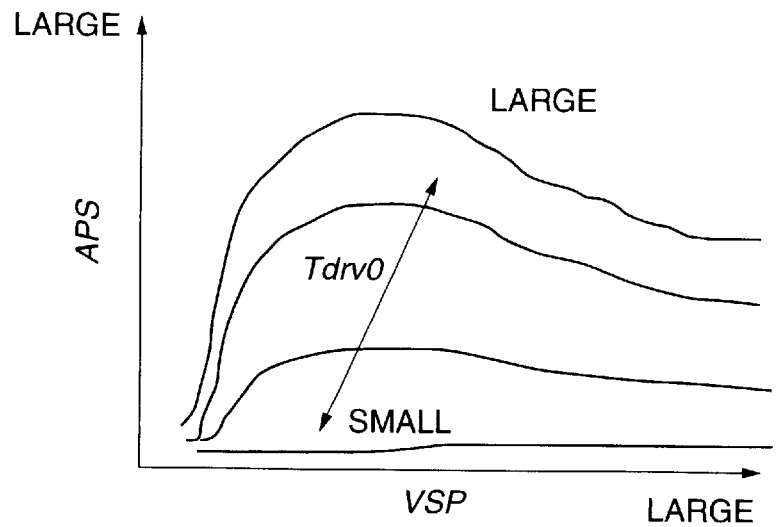
FIG. 13 is a map showing the relation of a vehicle speed VSP, accelerator pedal depression degree APS and target drive torque basic value Tdrv0 stored by the controller.

In a step S51, the target drive torque basic value Tdrv0 according to the vehicle speed VSP and accelerator pedal depression degree APS is calculated by looking up a map shown in FIG. 13 which was prestored in the controller 16.

Figure 14:
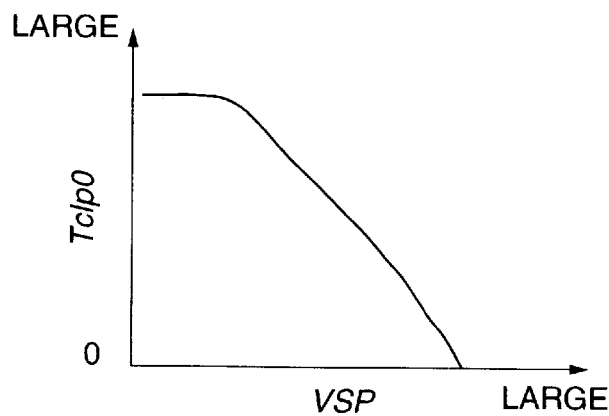
FIG. 14 is a map showing the relation of the vehicle speed VSP and a creep torque Tclp0 stored by the controller.

In a step S52, a creep torque Tclp0 according to the vehicle speed VSP is calculated by looking up a map shown in FIG. 14 which was prestored in the controller 16.

Figure 15:
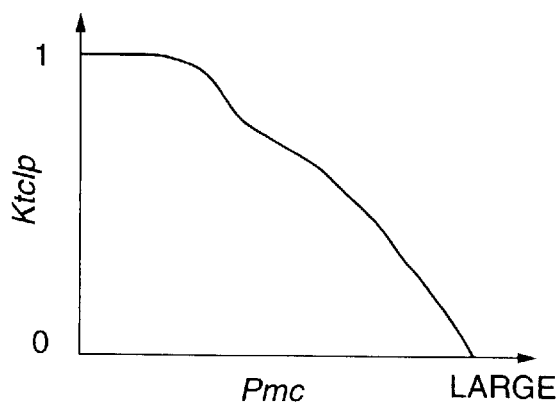
FIG. 15 is a map showing the relation of a master cylinder pressure Pmc and a creep torque correction factor Ktclp stored by the controller.

In a step S53, a creep torque correction coefficient Ktclp according to the master cylinder pressure Pmc is calculated by looking up a map shown in FIG. 15 prestored in the controller 16.

In a step S54, a target drive torque Tdrv is calculated by the following equation (6) from the target drive torque basic value Tdrv0, creep torque Tclp0 and creep torque correction coefficient Ktclp.

$$Tdrv = Tdrv0 + Tclp0 \cdot Ktclp \tag{6}$$

The creep torque Tclp0 is a torque which tends to move the vehicle forward when the accelerator pedal is not depressed.

As shown in FIG. 14, when the vehicle speed VSP exceeds a predetermined value, the creep torque will be 0, and the target drive torque Tdrv will become equal to the target drive torque basic value Tdrv0.

The creep torque correction coefficient Ktclp is a coefficient for decreasing the creep torque according to the depression of the brake, and when the master cylinder pressure Pmc exceeds a predetermined pressure, the creep torque correction factor Ktclp is 0. Also in this case, the target drive torque Tdrv is equal to the target drive torque basic value Tdrv0.

In a step S5, the target drive torque Tdrv determined in this way is compared with the maximum torque Tmamx·ip·RTO# which the motor 4 can exert on the a drive wheels 8 calculated in the step S3, and it is determined whether or not immediate startup of the engine 2 is necessary.

Figure 16:
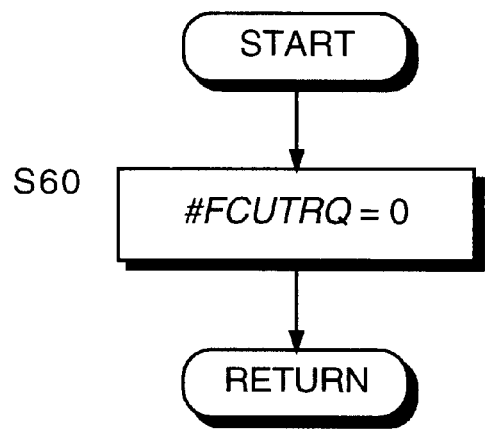
FIG. 16 is a flowchart describing a subroutine for starting up the engine for the purpose of reinforcing drive force.

The processing of the step S7, which is performed when it is determined that immediate startup or continued operation of the engine is necessary in the step S5, is performed by the subroutine shown in FIG. 16.

Herein, a fuel cut flag #FCUTRQ is reset to 0 in a step S60, and fuel injection of the engine 2 is performed by the engine control unit.

The fuel cut flag #FCUTRQ=1 denotes that fuel cut should be performed, and #FCUTRQ=0 denotes that fuel cut should not be performed, i.e., fuel should be injected.

When this subroutine is performed when the engine 2 is not operating, the fuel cut flag #FCUTRQ is reset to 0, and the motor control unit 30 of the controller 16 drives the motor 1 to start cranking the engine 2 while the engine control unit performs fuel injection based on the fuel cut flag #FCUTRQ=0.

When this subroutine is performed when the engine 2 is operating, the fuel cut flag #FCUTRQ is maintained at 0 so as to continue the fuel injection.

Figure 17:
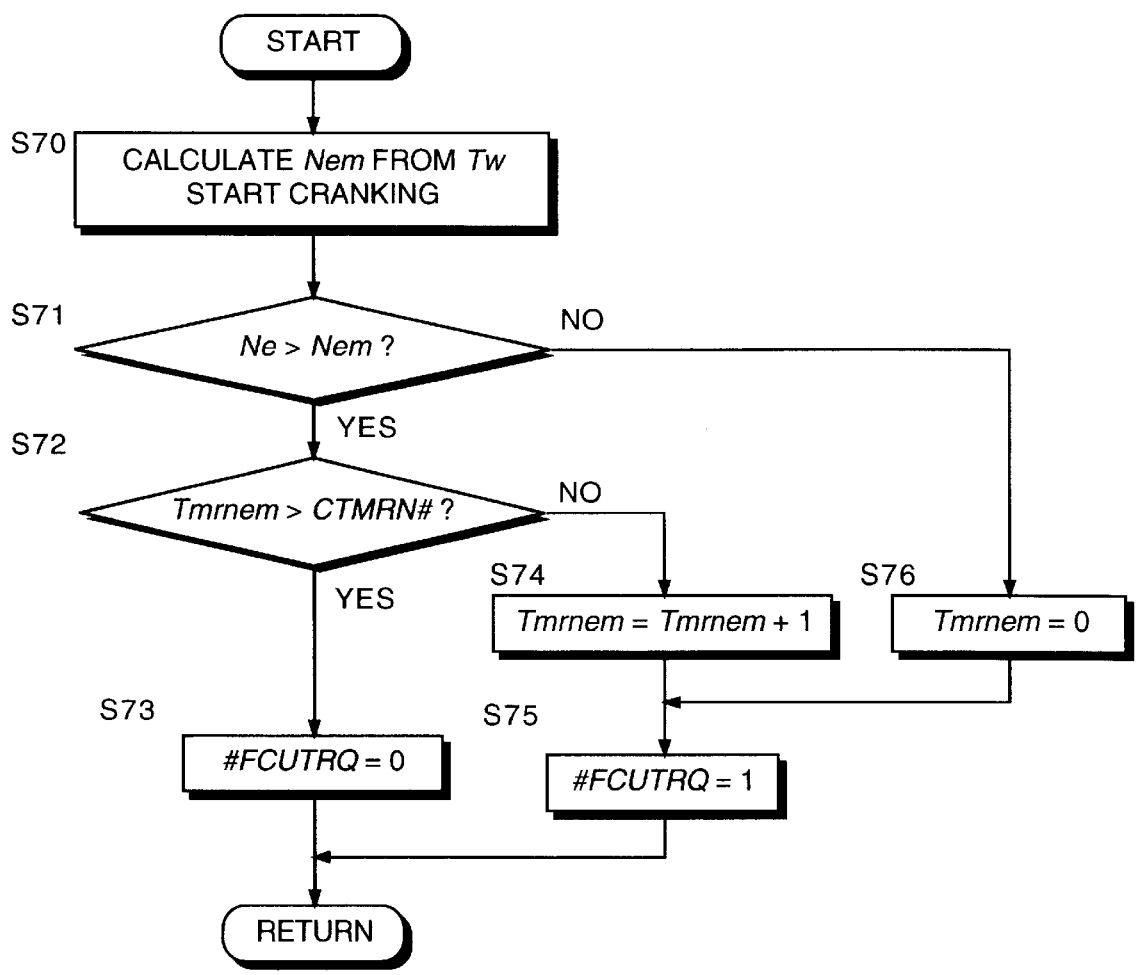
FIG. 17 is a flowchart describing a subroutine for starting up the engine for the purpose of changing over drive force.

When it is determined that a gradual start is required in the step S6, the processing of the step S8 is performed by the subroutine shown in FIG. 17.

Figure 18:
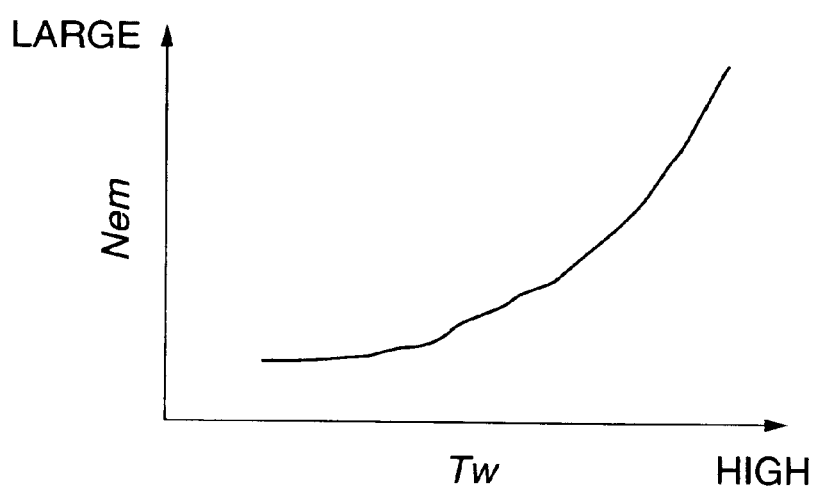
FIG. 18 is a map showing the relation of an engine cooling water temperature Tw and an engine rotation speed threshold value Nem stored by the controller.

Here, in a step S70, the cooling water temperature Tw of the engine 2 is first read. The threshold value Nem of the engine rotation speed according to the water temperature Tw is then calculated by looking up a map shown in FIG. 18 which was prestored in the controller 16. At the same time, on condition that the engine 2 has stopped, the motor 1 is driven to start cranking the engine 2.

In a step S71, the present engine rotation speed Ne and the threshold value Nem are compared, and if the engine rotation speed Ne does not exceed the threshold value Nem, the routine proceeds to a step S76 and a timer value Tmmem is reset to 0. Also, the fuel cut flag #FCUTRQ is set to 1 in a step S75.

Hence, fuel injection is not performed.

On the other hand, when the engine rotation speed Ne exceeds the threshold value Nem in the step S71, the timer value Tmmem is compared with a predetermined value CTMRN# in a step S72. Until the timer value Tmmem exceeds the predetermined value CTMRN#, the subroutine proceeds to a step S74 every time the subroutine is executed, and the timer value Tmrnem is incremented.

In a following step S75, the fuel cut flag #FCUTRQ is set to 1, and the subroutine is terminated.

That is, after the engine rotation speed Ne exceeds the threshold value Nem, fuel injection is not performed until a time corresponding to the predetermined value CTMRN# elapses.

When the timer value Tmmem exceeds the predetermined value CTMRN# in the step S72, the subroutine proceeds to a step S73 for the first time, resets the fuel cut flag #FCUTRQ to 0, and terminates.

Hence, fuel injection is performed and the engine 2 starts combustion.

In this gradual start, only cranking of the motor 1 by the engine 2 is performed, and fuel injection is not performed until the predetermined time CTMRN# elapses after the engine rotation speed Nem according to the water temperature Tw is attained.

By using the intake air flowrate Qa measured by the air flow meter 25 during this fuel cut period, the engine control unit can precisely control the fuel injection and ignition which are performed later.

If the engine 2 has already started combustion, both conditions of the steps S71 and S72 hold so the fuel cut flag #FCUTRQ is held at 0 in the step S73, and fuel injection is continued.

Figure 19:
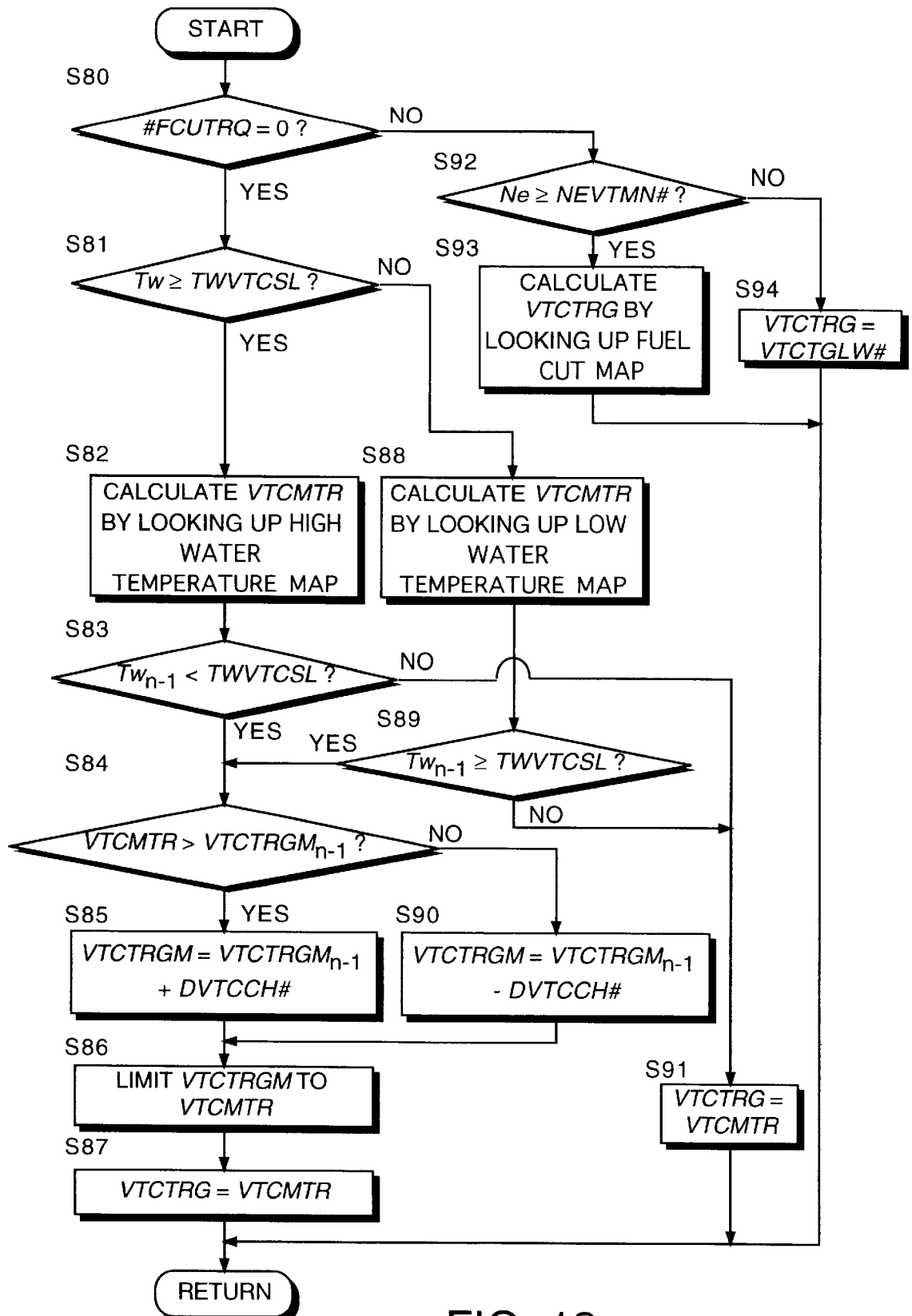
FIG. 19 is a flowchart describing a subroutine for determining a valve timing performed by the controller.

FIG. 19 shows the subroutine for controlling the open/close timing of the intake valve performed in the step S10.

First, in a step S80, it is determined whether or not fuel cut is being performed from the fuel cut flag #FCUTRQ. If fuel cut is being performed, i.e., when #FCUTRQ=1, the subroutine proceeds to a step S92. When fuel cut is not being performed, i.e., #FCUTRQ=0, the subroutine proceeds to a step S81.

In the step S81, the water temperature Tw is compared with a predetermined threshold value TWVTCSL, and when the water temperature Tw exceeds the threshold value TWVTCSL, the subroutine proceeds to a step S82. When the water temperature Tw is less than the threshold value TWVTCSL, the subroutine proceeds to a step S88.

Figure 20:
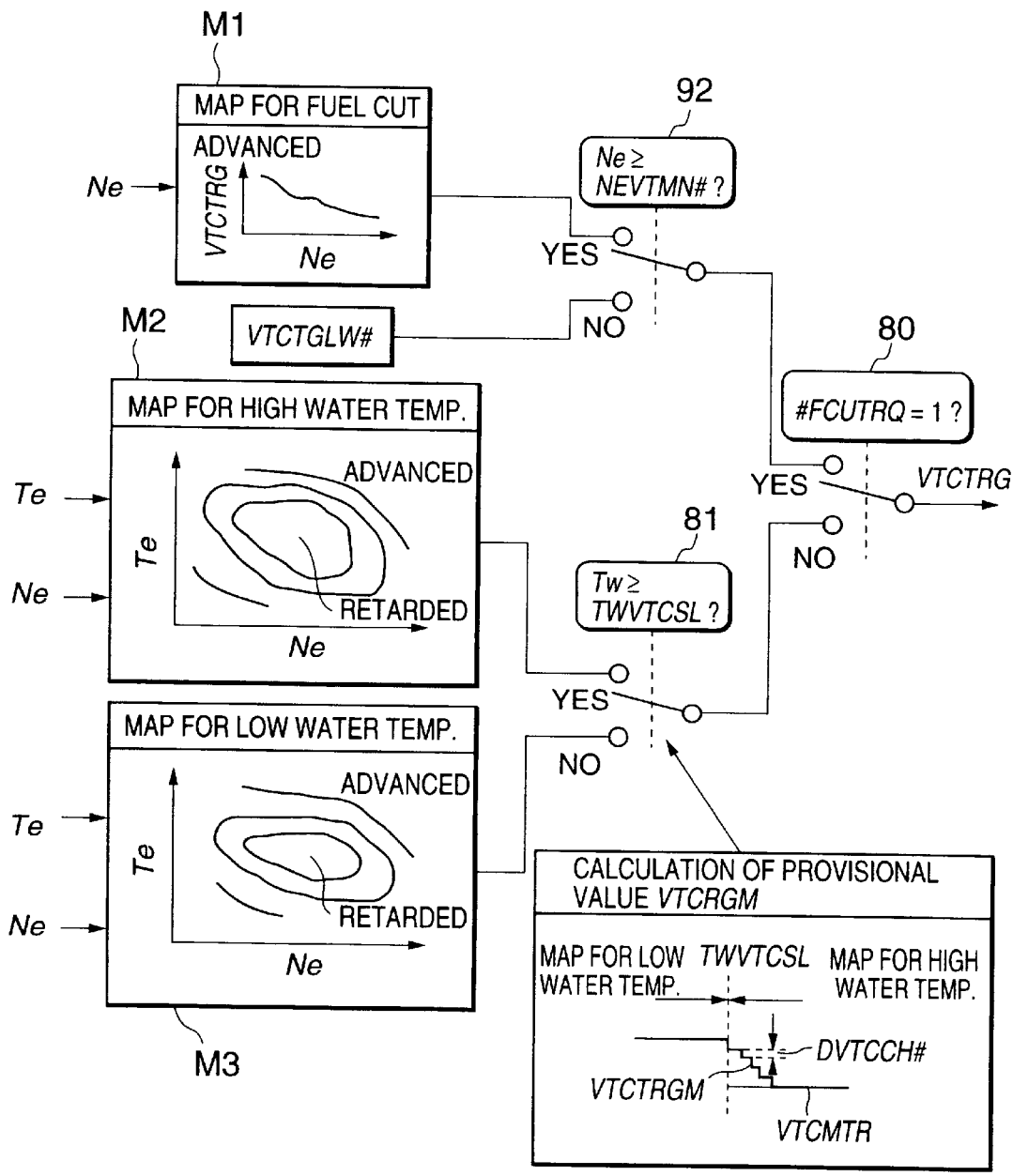
FIG. 20 is a block diagram describing the construction of the controller regarding the determination of the valve timing.

In the step S82, a map value VTCMTR of the open/close timing of the intake cam 51A is calculated from the engine rotation speed Ne and a target engine torque Te by looking up a high water temperature map M2 shown in FIG. 20 which was prestored in the controller 16.

Herein, the target engine torque Te is defined as follows.

When the drive wheels 8 are driven only by the engine 2, the target engine torque Te is equal to a value obtained by dividing the target drive torque Tdrv0 found in the step S51 by the product of the aforesaid speed ratio ip and the ratio RTO#.

When both the engine 2 and the motor 4 are driving the drive wheels 8, the target engine torque Te is obtained by subtracting the maximum torque Tmamx which can be supplied by the motor 4 from the value obtained by dividing the target drive torque Tdrv0 by the product of the speed ratio ip and the ratio RT0#.

In a following step S83, it is determined whether or not a water temperature $Tw_{n-1}$ on the immediately preceding occasion when the subroutine was executed is less than a threshold value TWVTCSL, i.e., it is determined whether or not the water temperature Tw reached the threshold value TWVTCSL for the first time on the present occasion when the subroutine is executed. When the water temperature Tw has reached the threshold value TWVTCSL for the first time on the present occasion when the subroutine is executed, the subroutine proceeds to a step S84.

When the water temperature $Tw_{n-n}$ on the immediately preceding occasion also exceeded the threshold value TWVTCSL, the routine proceeds to a step S91, the map value VTCMTR is output to the solenoid 41 as a target timing VTCTRG of the intake cam 51A, and the subroutine is terminated.

On the other hand, in the step S88, the map value VTCMTR of the timing of the intake cam 51A is calculated from the engine rotation speed Ne and target engine torque Te by looking up a low water temperature map M3 shown in FIG. 20.

In a following step S89, it is determined whether or not the water temperature $Tw_n$ was equal to or greater than the threshold value TWVTCSL on the immediately preceding occasion when the subroutine was executed, i.e., it is determined whether or not the water temperature Tw has become less than the threshold value TWVTCSL for the first time on the present occasion when the subroutine is executed. When the water temperature Tw has become less than the threshold value TWVTCSL for the first time on the present occasion when the subroutine is executed, the subroutine proceeds to the step S84. When the water temperature $Tw_{n-1}$ on the immediately preceding occasion was also less than the threshold value TWVTCSL, the subroutine proceeds to the step S91, the map value VTCMTR was output to the solenoid 41 as the target timing VTCTRG of the intake cam 51A, and the subroutine is terminated.

Therefore, the subroutine proceeds to the step S84 when there is a change in the relation of the water temperature $Tw_{n-1}$ to the threshold value TWVTCSL.

In the step S84, the map value VTCMTR is compared with the target timing $VTCTRGN_{n-1}$ output on the immediately preceding occasion when the subroutine was executed. When the map value VTCMTR is larger than the value $VTCTRGN_{n-1}$ on the immediately preceding occasion, a provisional value VTCTRGM of the target timing is determined in a step S85 by adding a predetermined variation DVTCCH# to the value $VTCTRGN_{n-1}$ on the immediately preceding occasion.

On the other hand, when the map value VTCMTR is equal to or less than the value $VTCTRG_{n-1}$ on the immediately preceding occasion, the subroutine proceeds to a step S90, and a provisional value VTCTRGM of the target timing is determined by subtracting the predetermined variation DVTCCH# from the value $VTCTRG_{n-1}$ on the immediately preceding occasion. The variation DVTCCH# is a value which avoids generating a large gap in the target timing VTCTRG due to change-over of maps, and it is determined by applying a predetermined lamp function, etc.

Next, after the processing of the steps S85 or S90, the a subroutine proceeds to a step S86. Here, after applying a limit so that the provisional value VTCTRGM does not exceed the map value VTCMTR, a map value VTCTRGM after limiting is output to the solenoid 41 as the target timing VTCTRG in a step S87, and the subroutine is terminated.

On the other hand, when the engine 2 is in fuel cut, i.e., when #FCUTRQ=1 in the step S80, the engine rotation speed Ne is compared with a predetermined speed NEVTMN# in a step S92.

When the engine rotation speed Ne is larger than or equal to the predetermined speed NEVTMN#, the subroutine proceeds to a step S93.

Here, the subroutine is terminated after outputting the target timing VTCTRG according to the engine rotation speed Ne to the solenoid 41 by looking up a map M1 shown in FIG. 20 which was prestored in the controller 16. This map has the characteristic that the target timing VTCTRG is retarded the larger the engine rotation speed Ne.

On the other hand, when the engine rotation speed Ne does not reach the predetermined speed NEVTMN#, a fixed value VTCTGLW# is output to the solenoid 41 as the timing VTCTRG in the step S94, and the subroutine is terminated.

The above open/close timing control of the intake valve is summarized in the block diagram of FIG. 20.

In this figure, during fuel cut of the engine 2, a fuel cut flag determining unit 80 corresponding to the step S80 changes over from the output of a map change-over part 81 equivalent to the step S81 to the output of an engine rotation speed determining part 92 equivalent to the step S92.

Hence, during fuel cut of the engine 2, the engine rotation speed determining unit 92 holds the target timing VTCTRG at the fixed value VTCTGLW#, and delays the open/close timing of the intake valve until the engine rotation speed Ne reaches the predetermined speed NEVTMN#.

When the engine rotation speed Ne reaches the predetermined speed NEVTMN#, the engine rotation speed determining unit 92 advances the target timing VTCTRG by a map M1 during fuel cut, and is then retarded again according to the increase of the engine rotation speed Ne.

Running of the engine 2 under fuel cut is performed when there is a gradual start of the engine 2 or when regenerative power is generated by the motors 4 and 1. In the gradual start of the engine 2, cranking of the engine 2 by the motor 1 is made easy and vibration of the engine 2 is suppressed by retarding the open/close timing of the intake valve by the fixed value VTCTGLW#. After the engine rotation speed Ne has reached the predetermined speed NEVTMN#, the target timing VTCTRG is advanced by the map M1 during fuel cut and fuel supply is started. By advancing the target timing VTCTRG, the output torque of an engine 2 is established quickly when fuel supply begins. On the other hand, when regenerative power is generated by the motors 4 and 1, the resistance of the engine 2 to regenerative power generation is kept low and power regeneration efficiency is increased by retarding the open/close timing of the intake valve as the engine rotation speed Ne increases.

When fuel cut is not performed, the engine rotation speed determining unit 92 equivalent to the step S92 changes over between the high water temperature map M2 and low water temperature map M3 according to the cooling water temperature Tw of the engine 2. A non-fuel cut state is when the engine 2 is running, and includes immediate startup.

Both of the maps M2, M3 are set so that the target engine torque Te is obtained. Therefore, when immediate startup of the engine 2 is performed, the engine torque needed immediately after complete combustion of the engine 2 can be obtained, and the requirement for rapid acceleration can be met.

It should be noted that the functions of the fuel cut flag determining part 80, map change-over part 81 and engine rotation speed determining part 92 were all described as virtual devices of the controller 16, and do not exist as physical entities. The contents of Tokugan Hei 10-317344, with a filing date of Nov. 9, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above embodiment, the target timing VTCTRG is set according to the target engine torque Te and the engine rotation speed Ne using the high water temperature map M2 and low water temperature map M3, but the target timing VTCTRG may also be set by, for example, a value indicative of engine load such as the accelerator pedal depression degree APS and the engine rotation speed Ne.

Further, when the engine 2 is a spark ignition type engine, a flag denoting ignition cut may be used instead of the fuel cut flag #FCUTRQ.

The embodiments of this invention in which an exclusive property or privilege is claimed are defined as follows:

What is claimed is:

1. A valve timing control device for changing over an open/close timing of an intake valve of an engine of a hybrid electric vehicle, the engine comprising a combustion stop device for stopping combustion of the engine in a predetermined vehicle running condition, the control device comprising:
    an actuator which varies the open/close timing of the intake valve according to an input signal; and
    a microprocessor programmed to:
        determine whether or not engine combustion has stopped;
        control the signal so that the open/close timing of the intake valve is retarded when engine combustion has stopped compared to a case when combustion has not stopped; and
        control fuel supplied to the engine,
    wherein the engine is operable in both an immediate start mode, in which a fuel is immediately supplied with a start of the vehicle, and a gradual start mode, in which fuel supply will be delayed from the start of the vehicle, and
    wherein said microprocessor controls the fuel supplied to the engine according to the desired mode of operation.

2. A valve timing control device as defined in claim 1, wherein the combustion stop device comprises either one of a device which stops fuel supply to the engine, and a device which stops ignition of fuel supplied to the engine.

3. A valve timing control device as defined in claim 1, wherein the predetermined vehicle running condition comprises startup of the engine.

4. A valve timing controller as defined in claim 1, wherein the vehicle is a hybrid electric vehicle comprising the engine and a motor connected via a clutch, and the predetermined vehicle running condition comprises startup of the engine performed during running of the vehicle under a drive force of the motor.

5. A valve timing control device as defined in claim 4, wherein the hybrid electric vehicle is designed to use the drive force of the engine for the running of the vehicle when a vehicle speed exceeds a predetermined speed during the running of the vehicle under the drive force of the motor, and the predetermined vehicle running condition comprises startup of the engine when the vehicle speed exceeds the predetermined speed while the vehicle is running under the drive force of the motor.

6. A valve timing control device as defined in claim 5, wherein the control device further comprises a sensor which detects a rotation speed of the engine, and the microprocessor is further programmed to advance the valve open/close timing when the rotation speed of the engine exceeds a predetermined speed as compared to the time before the rotation speed of the engine exceeded the predetermined speed.

7. A valve timing control device as defined in claim 1, wherein the control device further comprises a sensor which detects a rotation speed of the engine, and the microprocessor is further programmed to set a retardation angle of the open/close timing of the intake valve to be larger the higher the rotation speed of the engine.

8. A valve timing control device as defined in claim 1, wherein the control device further comprises a sensor which detects a rotation speed of the engine, and the microprocessor is further programmed to determine the open/close timing of the intake valve according to a target engine torque and the rotation speed of the engine when the combustion stop device is not performing combustion stop of the engine, and control the signal based on a determined open/close timing of the intake valve.

9. A valve timing control device as defined in claim 8, wherein the vehicle is a hybrid electric vehicle comprising a motor which provides a torque for driving the vehicle and a clutch which connects the engine and motor, the vehicle being designed to use a torque of the engine for running the vehicle when a required torque exceeds a torque which can be supplied by the motor, and the microprocessor is further programmed to calculate the target engine torque by subtracting the torque which can be supplied by the motor from the required torque.

10. A valve timing control device as defined in claim 1, wherein the vehicle is a hybrid electric vehicle comprising a motor which provides a torque for driving the vehicle, a clutch which connects the engine and motor, a battery which supplies power to the motor, a generator connected to the engine for charging the battery and a drive wheel connected to the motor, and the predetermined running condition comprises a condition wherein the generator generates power by a rotation torque of the drive wheel transmitted to the engine via the clutch.

11. A valve timing control device as defined in claim 1, wherein the actuator comprises a sprocket driven by the engine, a cam which rotates together with the sprocket and opens and closes the intake valve, a piston which varies a relative rotation position of the sprocket and cam according to an oil pressure, and a control valve which applies the oil pressure to the piston according to the input signal.

12. A valve timing control device for changing over an open/close timing of an intake valve of an engine of a hybrid electric vehicle, the engine comprising a combustion stop device for stopping combustion of the engine in a predetermined vehicle running condition, the control device comprising:
    means for varying the open/close timing of the intake valve according to an input signal;
    means for determining whether or not engine combustion has stopped;
    means for controlling the signal so that the open/close timing of the intake valve is retarded when engine combustion has stopped compared to a case when combustion has not stopped; and means for controlling the fuel delivered to the engine based on a determined mode of operation, wherein the engine has either an immediate start mode, in which a fuel is immediately supplied with a start of the vehicle, and a gradual start mode, in which fuel supply will be delayed from the start of the vehicle.

13. A valve timing control method for changing over an open/close timing of an intake valve of an engine of a hybrid electric vehicle, the engine comprising a combustion stop device for stopping combustion of the engine in a predetermined vehicle running condition, the control method comprising:

determining whether or not engine combustion has stopped;

retarding the open/close timing of the intake valve when engine combustion has stopped compared to a case when combustion has not stopped;

determining an engine mode of operation, wherein the engine has either an immediate start mode, in which a fuel is immediately supplied with a start of the vehicle, and a gradual start mode, in which fuel supply will be delayed from the start of the vehicle; and supplying fuel to the engine based on the determined mode of operation.

14. A start control system for a hybrid electric vehicle, comprising:

a combustion engine;

an electric motor operatively connected to a driven wheel of the vehicle;

a clutch operatively engageable to the engine, wherein, when engaged, the driven wheel is connected to both the engine and the motor, wherein the engine has either an immediate start mode, in which a fuel is immediately supplied with a start of the vehicle, and a gradual start mode, in which fuel supply will be delayed from the start of the vehicle; and a microprocessor connected to the engine and programmed to:

determine whether the vehicle is to be started and generating a start signal;

in response to the start signal, determine which one of the modes should be selected; and control fuel supplied to the engine according to the determined mode of operation.

15. A start control system as defined in claim 14, further comprising:

a valve timing control device for changing an open/close timing of an intake valve of the engine; and an actuator which varies the open/close timing of the intake valve, wherein when the gradual start mode has been selected, the open/close timing of the intake valve is adjusted to reduce an engine friction.

16. A start control system as defined in claim 14, wherein a comparison is made between a target drive torque to be transmitted to the drive wheel and a maximum torque available, and based on the comparison result, a determination is made which one of the modes will be selected.

* * * * *